United States Patent [19]
Mills

[11] Patent Number: 5,634,742
[45] Date of Patent: Jun. 3, 1997

[54] BULKHEAD FOR AND METHOD FOR DRY ISOLATION OF DAM GATES

[75] Inventor: Michael G. Mills, Tulsa, Okla.

[73] Assignee: The United States of America as represented by the Secretary of the Army, Washington, D.C.

[21] Appl. No.: 513,733

[22] Filed: Aug. 10, 1995

[51] Int. Cl.$^6$ ................................ E02B 3/10; E02B 7/40
[52] U.S. Cl. ........................ 405/87; 405/80; 405/107; 405/111
[58] Field of Search .......................... 405/80, 87, 103, 405/104, 111, 112, 96, 90, 107, 203, 8–14

[56] References Cited

U.S. PATENT DOCUMENTS

| | | | |
|---|---|---|---|
| 1,858,664 | 5/1932 | Friedel | 405/90 |
| 2,966,778 | 1/1961 | Quirin | 405/203 |
| 3,335,572 | 8/1967 | Tsujioka | 405/14 |
| 4,729,692 | 3/1988 | Tucker | 405/107 |

*Primary Examiner*—Tamara L. Graysay
*Assistant Examiner*—Tara L. Mayo
*Attorney, Agent, or Firm*—Luther A. Marsh

[57] ABSTRACT

A bulkhead for dry isolation of dam gates, the bulkhead comprising a plurality of tubular log members bound together to form a platform assembly adapted to float in a horizontal attitude on a water body surface. Water and air conduits are in communication with one or more of the log members to cause the platform selectively to move between the horizontal attitude and a vertical attitude in the water body, and selectively to reduce and increase buoyancy of the platform. A conduit and valve is disposed in one of the log members for selectively permitting flow of water from the water body through the bulkhead. The invention further comprises a method for isolating a dam gate from an adjacent body of water.

11 Claims, 6 Drawing Sheets

BULKHEAD FOR AND METHOD FOR DRY ISOLATION OF DAM GATES

BACKGROUND OF THE INVENTION (1) Field of the Invention

The invention relates to isolating dam gates from adjacent bodies of water, such that the gates may be worked oil in a dry environment. More specifically, the invention is directed to a bulkhead which may easily be assembled and moved into operative position and, after completion of work on the gate, may easily be disassembled and stored in a dry environment.

(2) Description of the Prior Art

Currently, large floating structures, known as "bulkheads" are used to facilitate maintenance and repair work on gates of dams. The bulkhead blocks the water from the gate by forming a wall which spans from pier to pier (on either side of the gate) in front of the gate and sets on a ledge beneath the gate. The bulkhead, when not in use, is moored in the body of water at a location removed from the gate. In use, the bulkhead is moved from its mooring to the dam and in front of the gate. The bulkhead is flooded to sink the bulkhead onto the ledge beneath the gate. After work on the gate is completed, the bulkhead is evacuated, floated, and moved to the next gate or to its mooring location.

Such bulkheads weight approximately 500,000 pounds and are infrequently used, typically about every 5–10 years. Thus, most of the time the bulkhead is simply moored in the body of water. Because of the size and weight of the bulkhead, it is not practical to haul the bulkhead out of the water for dry storage. Accordingly, corrosion is a constant problem (and, on occasion, vandalism) and maintenance and repair of such bulkheads, done in the floating state, is very expensive.

Some dams are designed to receive "stop logs", or wall-like elements which, when used in combination, form a barrier in front of the dam, similar to a bulkhead. The dams adapted to receive stop logs are provided with grooves which are adapted to receive a plurality of the stop logs to block off water from a gate. The stop logs, typically about fifty feet in length, require handling by a crane to set in place. When not in use, the stop logs are stored in a dry location. The transportable size leads to ease of repair and maintenance for stop logs. However, not all dams are adapted to receive stop logs, and having a crane at the dam gate of a dam which can receive stop logs is often problematic and requires a skilled crane operator.

Thus, there is a need for a bulkhead which can be floated into position, similar to current bulkheads, but which can be removed from the water and stored in a dry location.

SUMMARY OF THE INVENTION

It is, therefore, an object of the invention to provide a bulkhead which comprises a plurality of discrete members which may be handled individually and assembled in the water into a floating platform.

A further object of the invention is to provide such a bulkhead which may be floated into position adjacent a dam gate and sunk in position for blocking water from the gate.

A further object of the invention is to provide such a bulkhead which may be floated from its sunken position and further floated away from the dam gate site, and disassembled and stored in a dry location.

A still further object of the invention is to provide a method for isolating a dam gate from a body of water.

With the above and other objects in view, as will hereinafter appear, a feature of the present invention is the provision of a bulkhead for dry isolation of dam gates, the bulkhead comprising a plurality of tubular log members bound together to form a platform assembly adapted to float in a horizontal attitude on a water body surface. Water and air conduit means are in communication with a selected one or more of the log members to flood and evacuate the log members to cause the platform selectively to move between the horizontal attitude and a vertical attitude in the water body, and selectively to reduce and increase buoyancy of the platform. Conduit and valve means are disposed in one of the log members for selectively permitting flow of water from the water body through the bulkhead.

In accordance with a further feature of the invention, there is provided a method for isolating a dam gate from a body of water, the method including the steps of providing a plurality of tubular log members and connecting together the log members to form a platform assembly adapted to float in a horizontal attitude on the surface of the body of water. One or more of the log members of the platform assembly are flooded to cause the platform assembly to move from the horizontal attitude to a vertical attitude in the body of water. The platform assembly is then moved, in the vertical attitude, to a position contacting dam piers on either side of the dam gate. While the platform assembly is held against the piers, the one or more log members are further flooded to reduce buoyancy of the platform assembly to cause the platform assembly to sink to a dam ledge structure, and an area between the dam gate and the platform assembly is evacuated, leaving the dam gate isolated from the water environment.

The above and other features of the invention, including various novel details of construction and combination of parts, will now be more particularly described with reference to the accompanying drawings and pointed out in the claims. It will be understood that the particular device and method embodying the invention are shown by way of illustration only and not as limitations of the invention. The principles and features of the invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENTS

Figure 1:
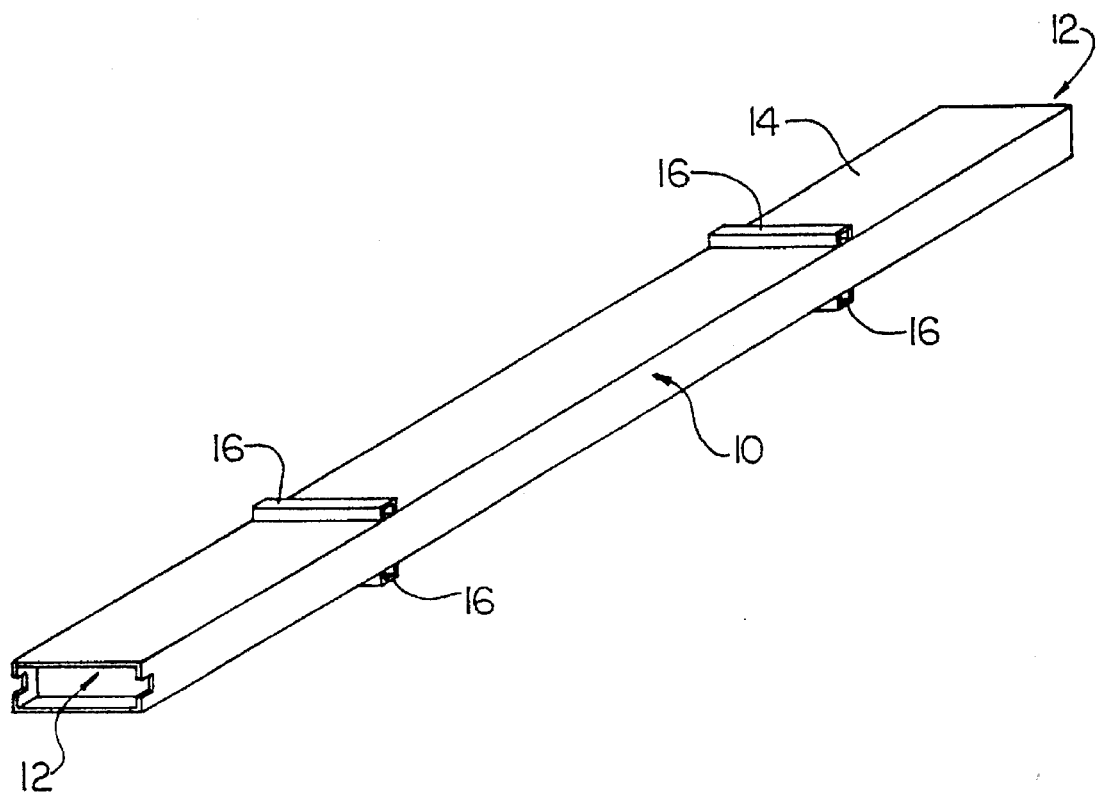
FIG. 1 is a perspective view of a single log member adapted for use in the illustrative bulkhead.

Referring to FIG. 1, it will be seen that a single log member 10 is of an elongated configuration having rectangularly-shaped ends 12. The log member 10 is a tubular member, and therefore hollow, and buoyant when placed in a water body. On each major surface 14 of the log member 10 there is provided a pair of width-wise extending tie-rod tubes 16. While different sizes of log members may be used for different locations, log members found useful are about fifty feet in length and about two and a half feet in width. The log members 10 preferably are of steel.

When it is desired to conduct maintenance or repairs on a dam gate, a plurality of the log members 10 are moved from dry storage into the body of water of interest, whereupon the log members float on the surface of the water in an attitude shown in FIG. 1.

Figure 2:
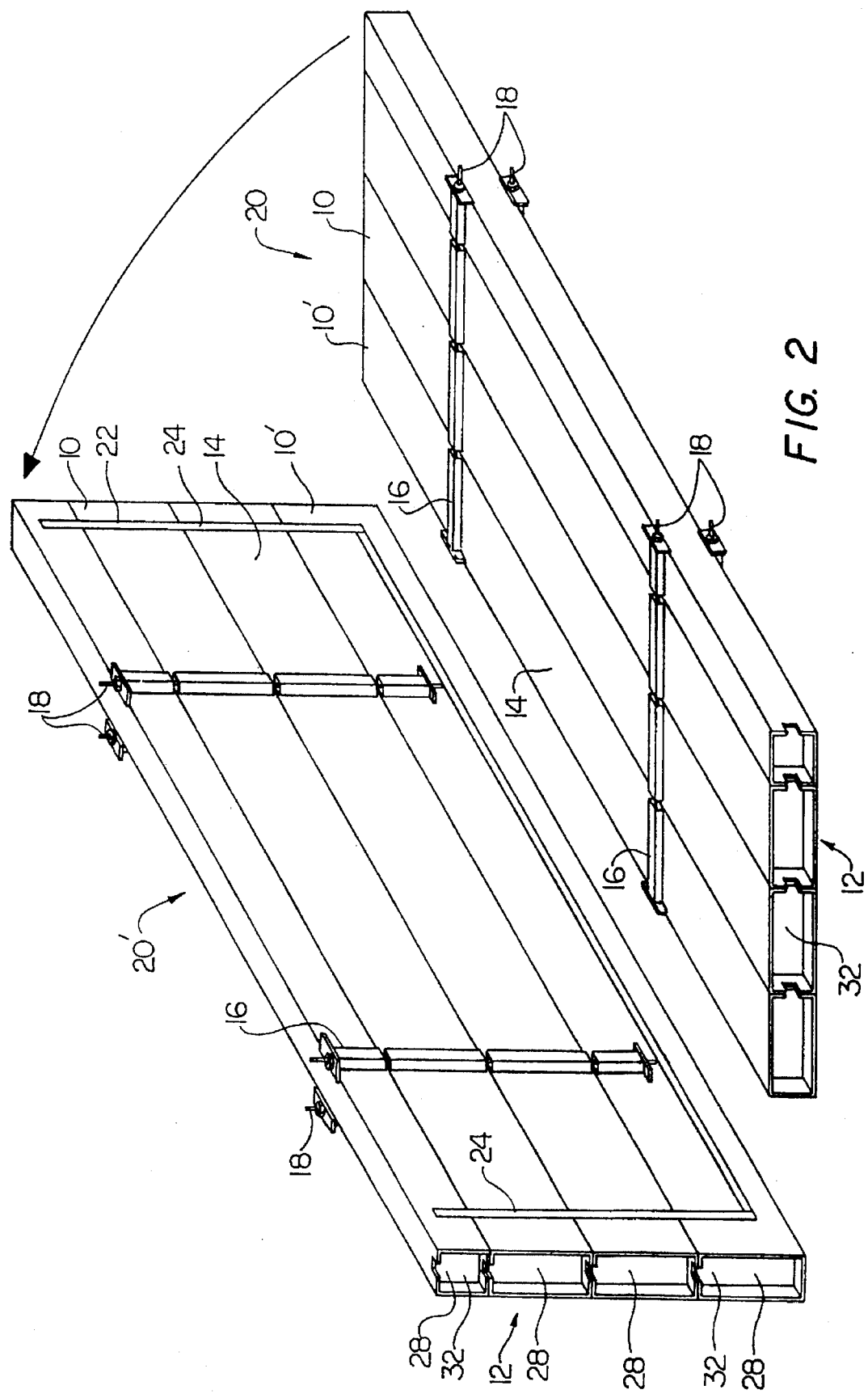
FIG. 2 is a perspective and diagrammatic depiction of one form of bulkhead illustrative of an embodiment of the invention, and a depiction of a transition step in the illustrative method.
Figure 3:
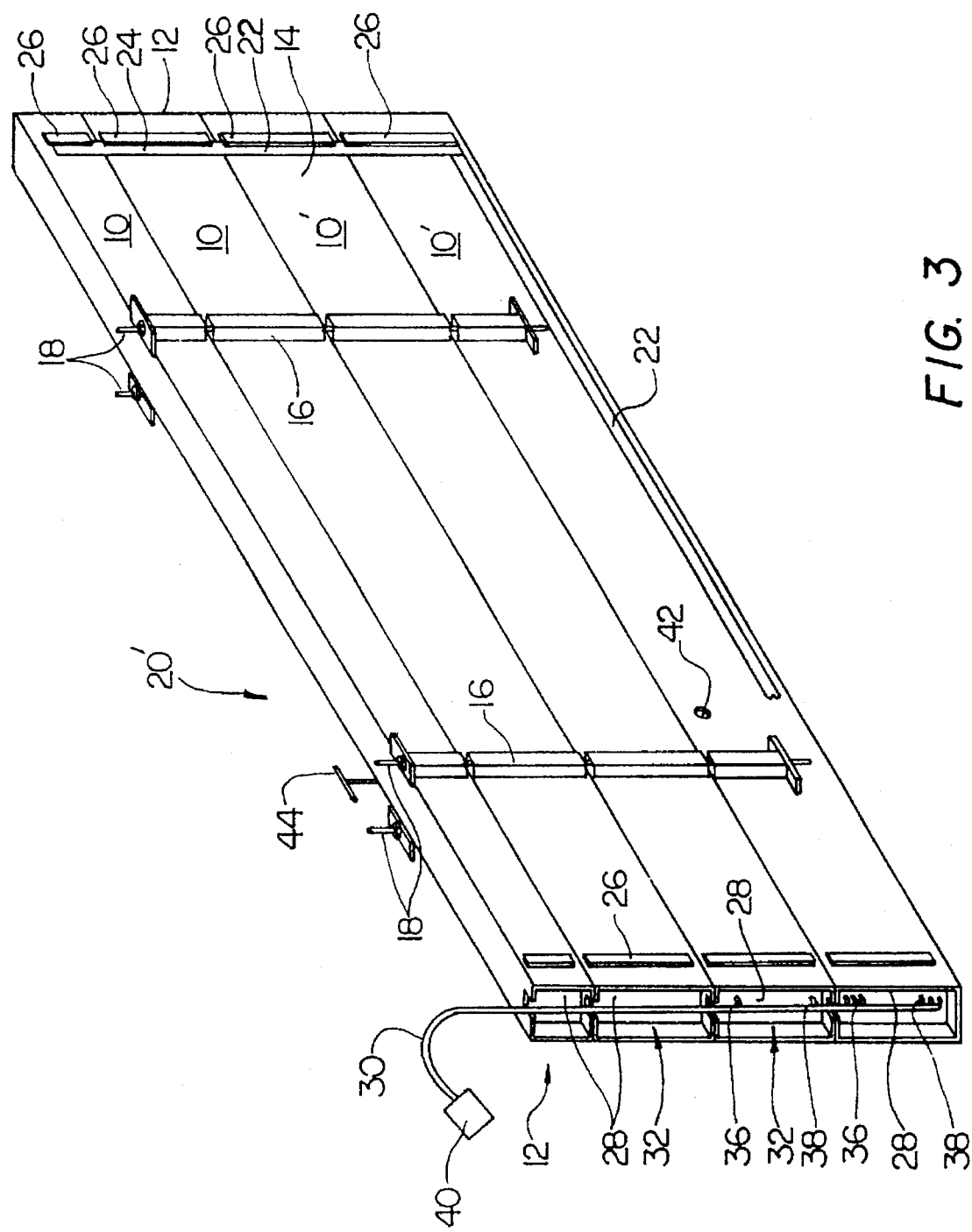
FIG. 3 is a perspective view of the bulkhead.

In shallow water, tie-rods 18 are inserted into aligned tie-rod tubes 16 of a selected number of log members 10 to bind together the log members in the configuration of a floating platform assembly 20, shown at the right side of FIG. 2. An elastomeric seal strip 22 is fixed to the underside of the platform assembly 20 by clamps 26, one series of which is illustrated in FIG. 3. The seal strip is of generally a u-shaped configuration having parallel legs 24 disposed so as to engage dam gate piers, as will be discussed hereinbelow.

After the platform assembly 20 is fully assembled, it is floatable raft-like to any location on the body of water. Initially, the platform assembly 20 is floated to water deep enough to accept the platform assembly in a vertical attitude, shown in the left portion of FIG. 2.

Referring still to FIG. 2 and to FIG. 3, it will be seen that each of the log members 10 is provided with an internal wall 28 proximate one end 12 of the member. A bundle 30 (FIGS. 3 and 4) of water hoses 38 and air hoses 36 are assembled so as to lead into compartment 32 formed in the log member 10 by the internal wall 28. The air hoses 36 and water hoses 38 connect to air conduits 37 and water conduits 39, respectively, which pass through the walls 28 of one or more of the log members (two shown in FIG. 3). The bundle 30 of hoses is provided with a connector 40 by which a second bundle of hoses (not shown) may be connected, to the aforementioned bundle 30 of hoses. The second bundle of hoses is connected to valve means, air pumps and water pumps mounted on a floating raft (not shown).

Figure 4:
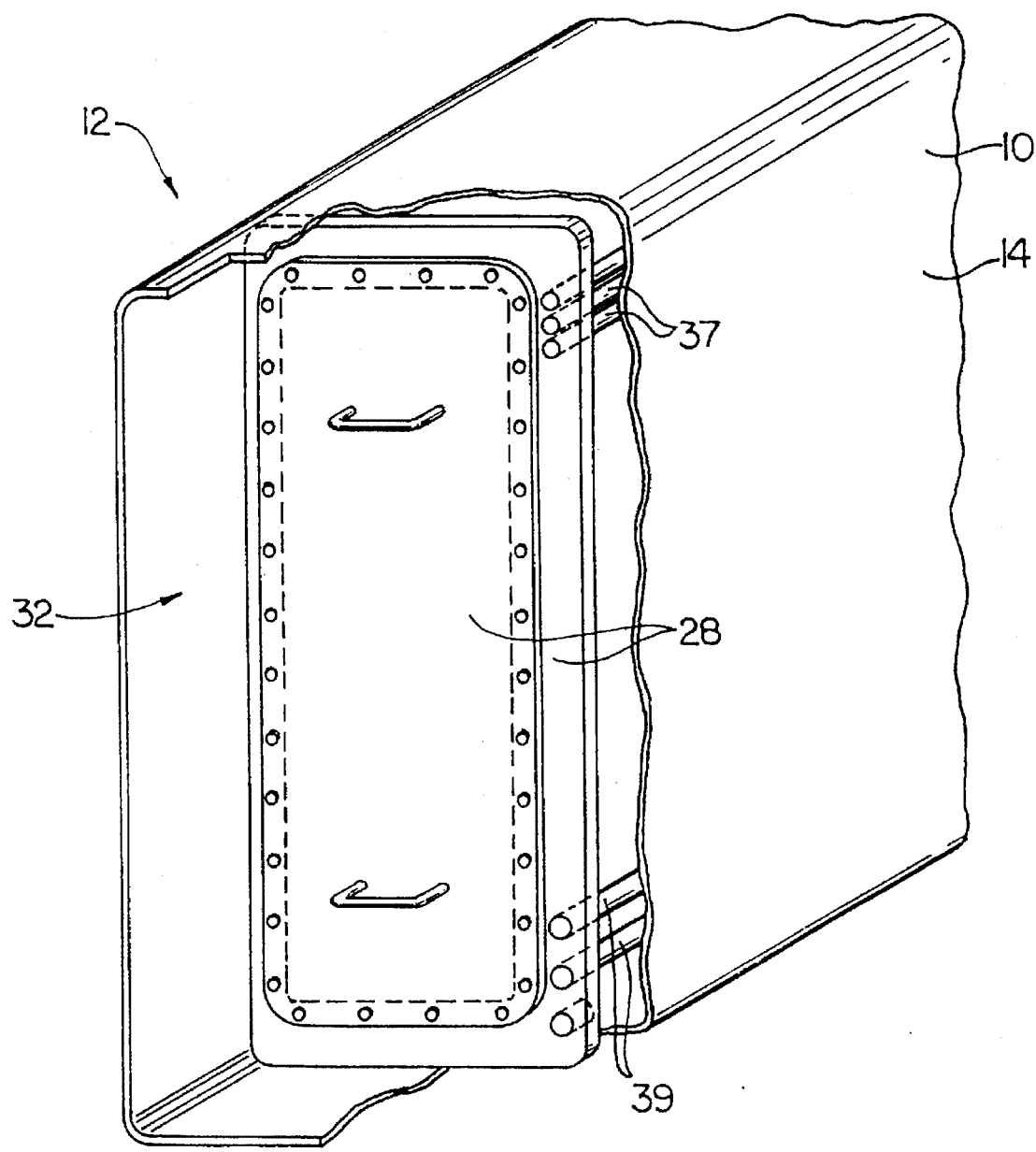
FIG. 4 is an enlarged view, in perspective and partly broken away, showing a portion of the log member of FIG. 1.
Figure 5:
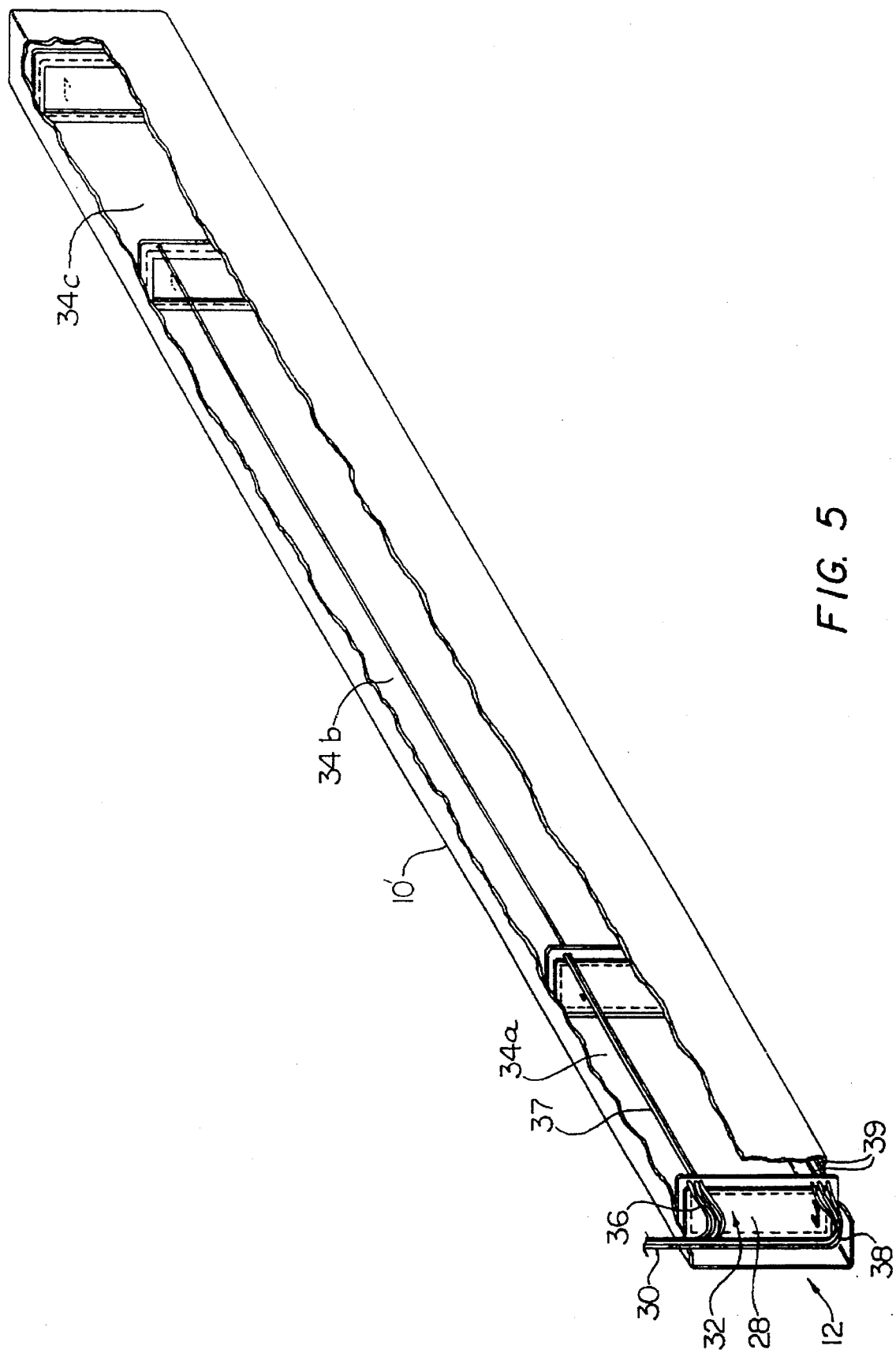
FIG. 5 shows the log member of FIG. 1 broken away to illustrate chambers therein.

To refine the ballasting of the bulkhead 20', one or more of the lower log members 10' may be divided internally into compartments, typically three compartments 34a, 34b, 34c (FIG. 5) per log. The air conduits 37 and the water conduits 39 are provided one for each of the three compartments. In FIG. 4, there are shown three of the air conduits 37 and three of the water conduits 39, each lending to its respective compartment within the log member. The bundle 30 is accordingly provided with three air hoses 36 and three water hoses 38 for each such log member provided. In FIG. 3, the bulkhead 20' is illustrated with the lower two leg members 10' provided with appropriate fittings for three air hoses and three water hoses.

In operation, the connector 40 (FIG. 3) of the platform assembly 20, still in the horizontal attitude, is connected to the second bundle of hoses. Water is admitted to one or more of the log members 10' in FIG. 3, and air is bled off, such that the log members 10' become sufficiently flooded to cause the platform assembly 20 to roll from the horizontal position shown in the right hand portion of FIG. 2, to the vertical position shown in the left hand portion of FIG. 2. After the platform assembly 20 has assumed the vertical position, it effectively becomes a bulkhead 20'.

Figure 6:
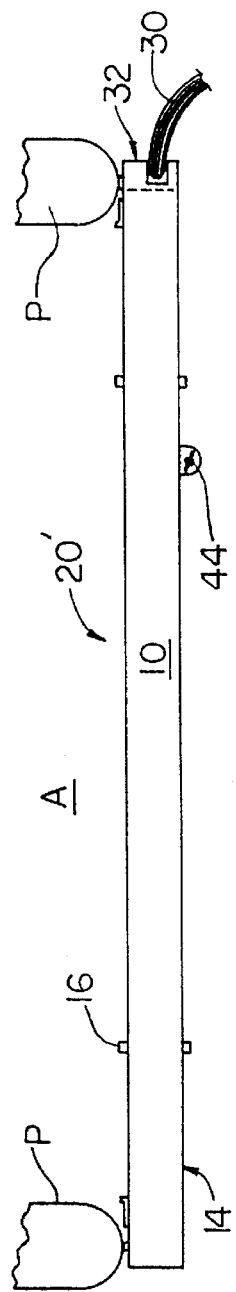
FIG. 6 is a top plan view of the bulkhead in place against dam pier members.
Figure 7:
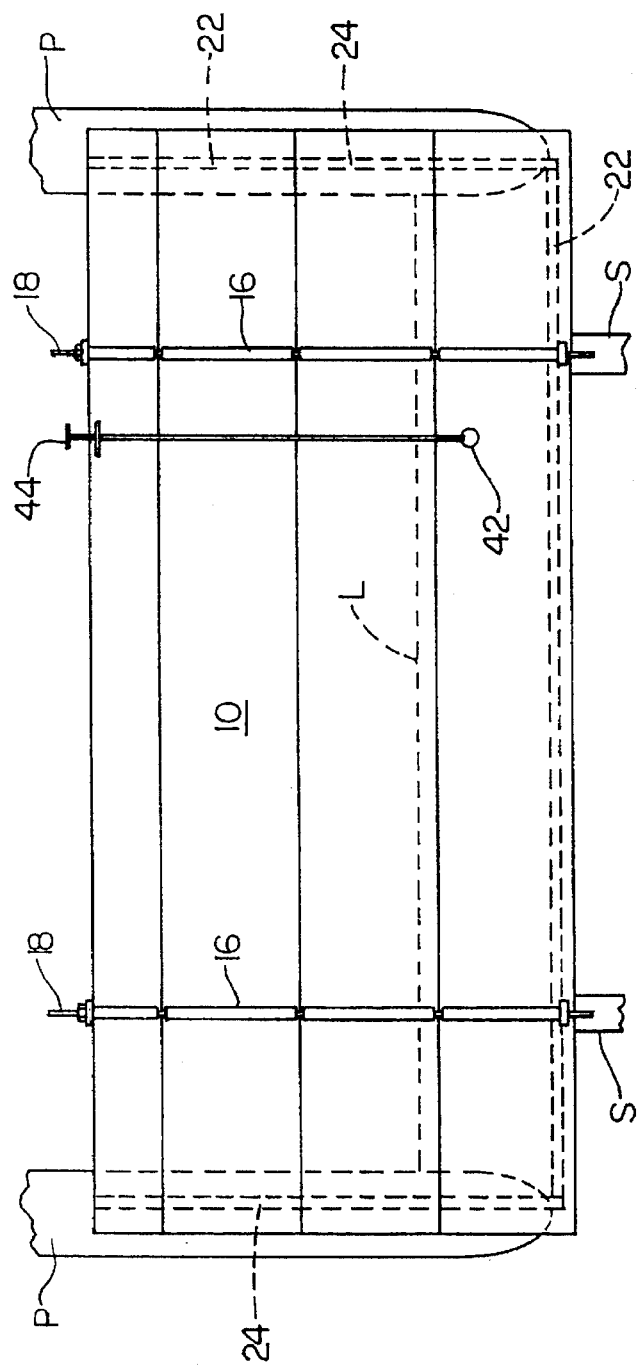
FIG. 7 is a front elevational view of the bulkhead shown in FIG. 4.

In the vertical attitude, the bulkhead 20' is floated to a position abutting piers P (FIG. 6) on either side of a dam gate (not shown). The seal legs 24 engage the piers P. While the bulkhead 20' is held against the piers P, the log members 10' are further flooded to cause the bulkhead to sink so as to come to rest on bulkhead seats S. The lower seal strip 22 engages a ledge portion L (FIG. 7) of the dam beneath the gate.

An area A (FIG. 6) between the bulkhead 20' and the gate is then pumped free of water, providing dry access to the gate.

After completion of work on the gate, the area A between the gate and the bulkhead 20' is filled with water. To this end, the bulkhead 20' is provided with a flow-through opening and valve 42 in one of the log members (FIG. 7) operated by an extended valve handle 44. The bulkhead is then raised off the ledge L by withdrawing water from the log members 10', and pumping air into the log members 10', and is floated to another gate, or to an area in the water body in preparation for disassembly and storage. In the latter case, the deballasting of the log members 10' is undertaken until the bulkhead 20' rolls back to the horizontal position, whereupon the bulkhead reassumes its floating platform attitude and may easily be floated into shallow water. The platform assembly is then disassembled and the individual log members 10 removed from the water and placed in dry storage.

There is thus provided a bulkhead which comprises a plurality of discrete members which may be handled individually and assembled in the water, may then be floated into position adjacent a dam gate and sunk into position for blocking water from the gate, and, after completion of work on the gate may be floated from its sunken position and away from the dam, and disassembled and stored in a dry location. There is further provided an improved method for isolating a dam gate from a body of water.

It is to be understood that the present invention is by no means limited to the particular construction herein disclosed and/or shown in the drawings, but also comprises any modifications or equivalents within the scope of the claims.

Having thus described my invention, what I claim as new and desire to secure by Letters Patent of the United States is:

1. A bulkhead for dry isolation of dam gates, said bulkhead comprising:

a plurality of tubular log members bound together to form a platform assembly adapted to float in a horizontal attitude on a water body surface;

water and air conduit means in fluid communication with a selected one or more of said log members to flood and evacuate said log members to cause said platform selectively to move between said horizontal attitude and a vertical attitude in said water body, and selectively to reduce and increase buoyancy of said platform; and conduit and valve means in one of said log members for selectively permitting flow of water from said water body through said bulkhead.

2. The bulkhead in accordance with claim 1 wherein each of said log members includes tie rod channels alignable with tie rod channels of other of said log members, and tie rods extending through said aligned channels to effect binding together of said log members to form said platform.

3. The bulkhead in accordance with claim 1 wherein said platform is provided with an elastomeric seal means on a first side of said platform, said seal means being substantially u-shaped and adapted for engagement with portions of a dam proximate a dam gate.

4. The bulkhead in accordance with claim 1 wherein each of said log members is provided with an internal wall spaced from an end of the log member to form an end compartment in said log member, said water and air conduit means comprising a bundle of water and air hoses extending through said end compartments of said log members of said platform, a selected number of said water and air hoses being in communication with interiors of selected log members through said walls to effect said flooding and evacuation of said log members.

5. The bulkhead in accordance with claim 1 wherein each of said log members is of substantially rectangular configuration in widthwise cross-section, a major surface of each of said log members serving as a bottom surface for said log member when said log member is in said horizontal attitude, and as an upright wall surface when said log member is in said vertical attitude.

6. A method for isolating a dam gate from a body of water, said method comprising the steps of:

providing a plurality of tubular log members;

connecting together said log members to form a platform assembly adapted to float in a horizontal attitude on the surface of said body of water;

flooding one or more of said log members to cause said platform assembly to move from said horizontal attitude to a vertical attitude in said body of water;

moving said platform assembly in said vertical attitude to a position contacting dam piers on either side of said dam gate;

holding said platform assembly against said piers and further flooding said one or more of said log members to reduce buoyancy of said platform assembly to cause said platform assembly to sink to a dam seat structure; and evacuating water from an area between said dam gate and said platform assembly.

7. The method in accordance with claim 6 including the additional step, before flooding of said one or more log members, of fixing to said platform assembly an elastomeric seal means positioned for engagement with said piers and dam wall portions beneath said gate.

8. The method in accordance with claim 6, the method including, in return of said gate to operation, the additional steps of:

flooding said area between said dam gate and said platform;

evacuating water from said one or more log members until said platform assembly floats off said dam seat structure; and moving said platform assembly from said gate.

9. The method in accordance with claim 8, including the further step of further evacuating water from said one or more log members until said platform assembly moves from said vertical attitude to said horizontal floating attitude.

10. The method in accordance with claim 9, including the further step of disconnecting said log members from each other.

11. The method in accordance with claim 10, including the further step of removing said log members from said body of water for dry storage.

* * * * *